Figure 1:
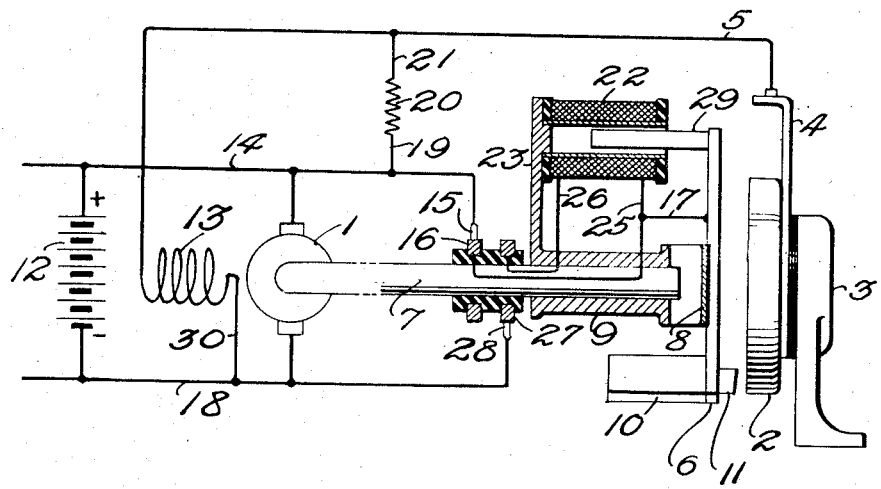

June 2, 1925.

F. W. MERRILL

CENTRIFUGAL SPEED REGULATOR

Filed Jan. 19, 1922

1,540,272

Inventor:
Frank W. Merrill
by
Atty.

Patented June 2, 1925.

1,540,272

UNITED STATES PATENT OFFICE.

FRANK W. MERRILL, OF EAST ORANGE, NEW JERSEY, ASSIGNOR TO WESTERN ELECTRIC COMPANY, INCORPORATED, OF NEW YORK, N. Y., A CORPORATION OF NEW YORK.

CENTRIFUGAL SPEED REGULATOR.

Application filed January 19, 1922. Serial No. 530,301.

*To all whom it may concern:*

Be it known that I, FRANK W. MERRILL, a citizen of the United States, residing at East Orange, in the county of Essex, State of New Jersey, have invented certain new and useful Improvements in Centrifugal Speed Regulators, of which the following is a full, clear, concise, and exact description.

This invention relates to improvements in motor speed regulators and particularly to speed regulators which are responsive to centrifugal force.

An object of the invention is to provide a means for regulating the speed of electrical motors, which is instantaneously responsive to variations of the motor speed and also to the electrical variations of the motor circuit.

Another object of this invention is to provide a compensating device for speed regulators which will anticipate changes in motor speed which are due to electrical variations in the motor circuit and which will prevent such speed changes from taking place by causing the electrical variations to make a mechanical change in the adjustment of the regulator which will offset their effect, permitting the speed to remain constant.

More specifically the invention relates to a device which is to be attached to centrifugal motor speed regulators to increase the accuracy of operation thereof. This device consists of a solenoid which is mounted to rotate with the revolving portion of the speed regulator and cooperates with a plunger mounted upon the flexible contacting member of the regulator to effect the distortion of this member. The solenoid is made responsive to either the voltage or the load of the motor circuit as one or the other of these circuit characteristics happens to be subjected to the larger variation in value, or it may be made responsive to both.

The inaccuracy in the operation of speed regulators which this solenoid is designed to overcome is mechanical in nature. Centrifugal speed regulators for electric motors generally consist of two contacts one fixed and the other flexibly mounted and movable into or out of engagement with the fixed contact against the resistance of a spring. Assume, for example, that the regulator is connected across a resistance in series with the shunt field of a motor which is subject to variations in terminal voltage, load changes, or a combination of the two; and that it is desired to hold the speed of the motor accurately at a certain value under all varying conditions. The usual method of setting the speed is to adjust the spacing of the contacts so as to obtain the desired speed under the conditions of half load and intermediate voltage. At the time of light load and maximum voltage the speed (with the regulator functioning) may rise anywhere from ¼ of 1% to 2% above this point, and at the time of full load and minimum voltage may fall the same percentage below the desired value. The primary cause of this variation is due to the mechanical characteristic of the regulator. Variable strain or deflection of the resilient arm holding the movable contact is required to produce the and at the time of full load and minimum variations in the field current required. If the motor is started slowly from rest and gradually brought up to speed (the regulator gap being set) the flexibly mounted contact is gradually deflected by the increasing centrifugal force of the weight through a greater and greater angle (but without vibration) until at a speed slightly higher than the regulating point it touches the fixed contact, short circuiting the resistance in series with the shunt field and causing an abrupt drop in speed. The spring, however, immediately opens the contact causing a sudden increase in speed. The opening and closing of the contacts in this manner sets the flexibly mounted arm into rapid vibration through a small arc, the changes in motor speed necessary to maintain this vibration being almost negligible in the case of a well designed regulator. If the gap is correctly adjusted, then the movable contact in its vibrations will short circuit the field resistance for just the right length of time to bring the average field current to a value that will hold the correct speed under intermediate conditions of voltage and load. Suppose that the condition now changes to that of maximum voltage and light load. If the shunt field current could be increased to just the right value the motor speed could be held exactly at the point of setting. In order for the regulator to increase the field current, however, it is necessary for the flexibly mounted arm to be deflected a little further so as to bring the contacts closer together. This is equivalent to moving the entire vibrating arc of the flexible contact closer to the fixed contact so that the flexible contact in its vibrations will be stopped and held against the fixed contact for a larger percentage of the time. Without any compensating device this increased deflection can only be brought about by an increase in speed of ¼% to 2% as mentioned above but if the vibrating arm could be deflected this extra amount by some other force then it would not be necessary for the speed to increase at all. A solenoid actuated either by the line voltage or the load current mounted so as to rotate with the moving element of the regulator can be used to supply this corrective force. Such a solenoid can be made strong enough to over-compensate, that is, to cause the motor to slow down with increased line voltage or to speed up with increased load if desired and by adjusting the strength of such a solenoid by external resistance almost perfect speed regulation may be obtained.

In addition to a plain shunt (voltage) or series (load) coil, the solenoid may be fitted with both a shunt and a series winding. In this case, the shunt winding is generally designed to have a greater magneto-motive force than the series winding even at the time of low voltage. The series coil is differentially connected and both load and voltage compensation is secured simultaneously.

In the drawings, Fig. 1 is a diagrammatic illlustration of a motor controlled by a centrifugal speed regulator provided with a compensator.

Figure 2:
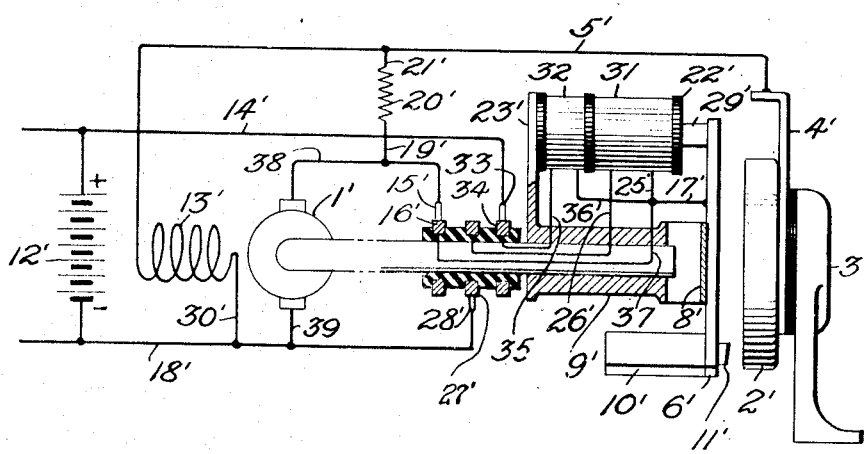

Fig. 2 is a schematic view showing a regulator provided with a compensator having differentially wound voltage and load coils.

Referring to the drawings in detail, a centrifugal speed regulator, which may be of the type disclosed in Patent No. 1,494,927, dated May 20, 1924, is associated with a shunt wound motor 1 for controlling its speed. The regulator has a stationary annular contact member 2 mounted upon a rigid support 3. An upwardly extending, hooked arm 4 provides a means for electrically connecting the member 2 to a conductor 5. A revolving contact member mounted adjacent annular member 2 for cooperation therewith comprises a bar 6 yieldingly attached to a resilient member 8 secured to a bushing 9 which is keyed to motor shaft 7. A weight 10 offset from one end of the bar 6 moves outwardly from the motor axis 7 under the influence of centrifugal force thereby causing deflection of bar 6 and distortion of resilient member 8 moving contact point 11, mounted on bar 6, in a direction parallel to the motor axis 7 into wiping engagement with stationary annular contact member 2. The engagement of revolving contact 11 and stationary annular contact 2 closes a circuit from a battery 12 or other suitable current source through a motor field 13 which may be traced as follows: positive pole of battery 12, conductor 14, brush 15, slip ring 16, conductors 25 and 17, bar 6, contacts 11 and 2, arm 4, conductor 5, shunt motor winding 13, conductors 30 and 18 to negative pole of battery 12. When regulator contacts 11 and 2 are separated, on the other hand, as occurs at reduced motor speeds, a second circuit for the motor field 13 is completed which is traced as follows: positive pole of battery 12, conductors 14 and 19, a resistance 20, conductors 21 and 5, shunt motor field 13, conductors 30 and 18 to negative pole of battery. The regulator, therefore, by cutting resistance 20 into and out of circuit with shunt motor field 13, operates to permit increased current to flow through said winding 13 when a decrease in speed is desired and decreased current when an increase in speed is desired.

The compensating device comprises a solenoid 22 mounted upon an arm 23 integral with and extending radially from bushing 9 for rotation with motor shaft 7 to which bushing 9 is keyed. This solenoid 22 may be energized across the battery leads, in series with one of them, or by a winding which combines these two methods. In Fig. 1, solenoid 22 is across the battery leads and is therefore responsive to the battery voltage. Its energizing circuit may be traced as follows: positive pole of battery 12, conductor 14, brush 15, slip ring 16, conductor 25, solenoid 22, conductor 26, slip ring 27, brush 28, conductor 18 to negative pole of battery 2. A plunger 29 mounted upon revolving contact bar 6 of the regulator moves within the solenoid 22 in response to the voltage of the battery leads, its movement serving to increase or decrease the deflection which the bar 6 receives as a result of the centrifugal action upon its weighted end.

Fig. 2 shows a modification of the invention in which the regulator is corrected for voltage and load by means of a solenoid 22' which is provided with two differential windings 31 and 32. The voltage winding 31 is positive in its action tending to close the regulator contacts when energized; whereas the load winding 32 has a bucking effect upon the voltage winding tending to open the regulator windings and to allow the motor speed to increase. The circuit of series winding 32 may be traced from positive pole of battery 12' through conductor 14', brush 33, slip ring 34, conductor 35, series winding 32, conductors 36 and 37, slip ring 16', brush 15', conductor 38, armature 1, conductors 39 and 18' to negative pole of battery 12′. The shunt winding 31 is energized from the positive pole of battery 12′, conductor 14′, brush 33, slip ring 34, conductor 35, series winding 32, conductors 36 and 25′, voltage winding 31, conductor 26′, slip ring 27′, brush 28′, conductor 18′ to negative pole of battery.

Shunt wound motor 1′ is energized over a circuit which may be traced from the positive pole of battedy 12′, conductor 14′, brush 33, slip ring 34, conductor 35, series winding 32, conductors 36 and 37, slip ring 16′, brush 15′, conductor 38, armature 1′, conductors 39 and 18′ to negative pole of battery 12′. Shunt field 13′ of motor 1′ is normally energized through a circuit including series resistance 20′ which may be traced from the positive pole of 12′, conductor 14′, brush 33, slip ring 34, conductor 35, series winding 32, conductors 36 and 37, slip ring 16′, brush 15′, conductors 38 and 19′, series resistance 20′, conductors 21′ and 5′, shunt field 13′, conductors 30′ and 18′ to negative pole of battery 12′. When an increase in line voltage or a decrease in line load occurs which would tend to increase the speed of the motor, differentially wound solenoid 22′ attracts its plunger (or core) 29′ thereby increasing the angle of distortion of the rotating member 6′ diminishing the distance between rotating contact 11′ and stationary contact 2′. As these contacts are finally brought into engagement their closing short-circuits resistance 20′ and causes field winding 13′ to be energized over the following circuit: positive pole of battery 12′, conductor 14′, brush 33, slip ring 34, conductor 35, series winding 32, conductors 36 and 17′, vibrating contact member 6′, contact point 11′, stationary contact 2′, arm 4′, conductor 5′, shunt winding 13′, conductors 30′, and 18′ to negative pole of battery 12′. The solenoid is thus made to anticipate changes in the speed of the shunt wound motor 1′ which would otherwise result from an increasing line voltage or a decreasing load.

What is claimed is:

1. A source of electric energy, an electric motor and a regulator therefor, said regulator comprising a solenoid mounted on the shaft of said motor and revolving therewith and adapted to be energized from said source of energy, a core for said solenoid movable therein in response to variations in said source of energy, a vibrating contact also mounted on and revolving with said shaft and in cooperative relation with said core and a fixed contact with which said vibrating contact is adapted to engage in response to speed changes in the motor and variations in said source.

2. A motor and a regulator therefor, said regulator comprising a revolving solenoid, a core therefor, a vibrating contact associated with said core and a fixed contact with which said vibrating contact is adapted to engage to regulate said motor in response to speed changes of the motor and electrical variations in the motor circuit.

3. An electric motor, a circuit therefor, a centrifugal speed regulating device therefor, and a compensating device associated with said centrifugal device comprising an electromagnet mounted on and revolving with the shaft of said motor and energized from said circuit adapted to cooperate with said centrifugal device to regulate said motor when electric variations occur in said circuit.

4. An electric motor, a circuit therefor, a centrifugal speed regulating device therefor and a compensating device associated with said centrifugal device comprising an electromagnet mounted on and revolving with the shaft of said motor and energized from said circuit adapted to cooperate with said centrifugal device to regulate said motor when voltage changes occur in said circuit.

5. An electric motor, a centrifugal speed regulating device therefor mounted on the shaft of said motor, compensating means associated with said device including an electromagnetic device mounted on said motor shaft and arranged to be responsive to electrical variations in the motor circuit and to cooperate with said regulating device to control the speed of said motor.

6. An electric translating device including an energizing circuit and a circuit to be controlled, means comprising a fixed and a movable contact associated with said device for making and breaking said circuit to be controlled, said movable contact operating in response to mechanical variations in said translating device during the operation thereof and an electromagnetic auxiliary device for further controlling said movable contact, said auxiliary device being adapted to operate in response to electrical variations in said energizing circuit.

7. A translating device, an energizing circuit therefor, means for controlling the energization of said device, said means comprising a fixed contact and a vibrating rotating contact cooperating therewith, a helix mounted for rotation with said rotating contact, a core operatively associated with said rotating contact and movable relatively to said helix whereby the position of said rotating contact is effected.

8. A translating device having an energizing circuit and a regulating circuit, means comprising a fixed contact and a movable contact responsive to centrifugal force for making and breaking said regulating circuit and a solenoid associated with the movable contact of the first mentioned means responsive to voltage variations in the circuit of said translating device, associated with said first mentioned means and cooperating therewith to control the opening and closing of the regulating circuit.

9. A translating device having an energizing circuit and a regulating circuit, means for making and breaking said regulating circuit and a compensating device associated with said means, said device having one winding responsive to the voltage of said energizing circuit and a second winding cooperating with said first winding, said second winding being responsive to the load in said energizing circuit.

10. A translating device having an energizing circuit and a regulating circuit, means responsive to centrifugal force for making and breaking said regulating circuit and a solenoid associated with said first mentioned means for opening and closing the regulating circuit, said solenoid having a winding responsive to the voltage of said energizing circuit and a second winding differentially wound with respect to said first winding, said second winding being responsive to the load in said energizing circuit.

11. In combination, an electric motor and a regulator therefor responsive to speed changes of the motor and variations in the electric current supplied to said motor, said regulator comprising a vibrating contact member and an electromagnetic device both resiliently mounted on the shaft of said motor, and a stationary contact member in cooperative relation with said vibrating contact member.

12. In combination, an electric motor and a regulator therefor responsive to speed changes of the motor and variations in the electric current supplying said motor, said regulator comprising a vibrating contact member and an electromagnetic device, both fixed to and revolving with the shaft of said motor, and a second contact member fixedly mounted and in cooperative relation with said first contact member, said electromagnetic device being controlled by said current supply to close said contacts.

13. In combination, an electric motor, a centrifugal speed regulating device therefor including a fixed and a vibrating contact, and compensating means associated therewith, comprising an electromagnetic device controlled by the current supplied to said motor and revolving with the shaft thereof to move said vibrating contact into engagement with said fixed contact.

In witness whereof, I hereunto subscribe my name this 16th day of January A. D., 1922.

FRANK W. MERRILL.